Jan. 5, 1937.   J. E. M. GRÈBY   2,066,345
AUTOMATIC TEMPERATURE REGULATOR
Filed July 17, 1931
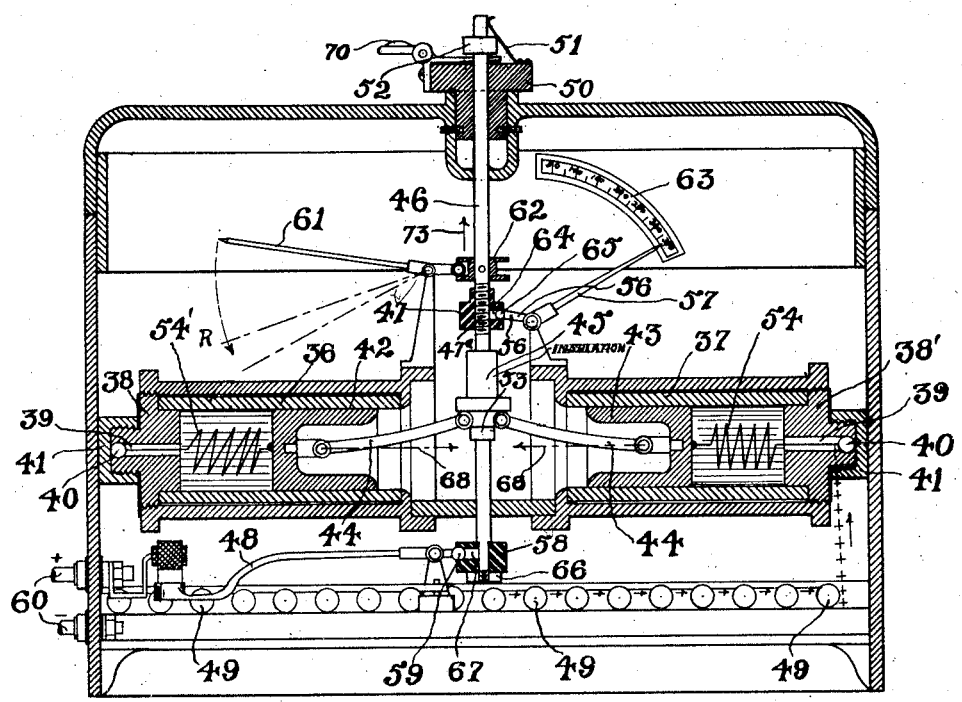
FIG. 1.
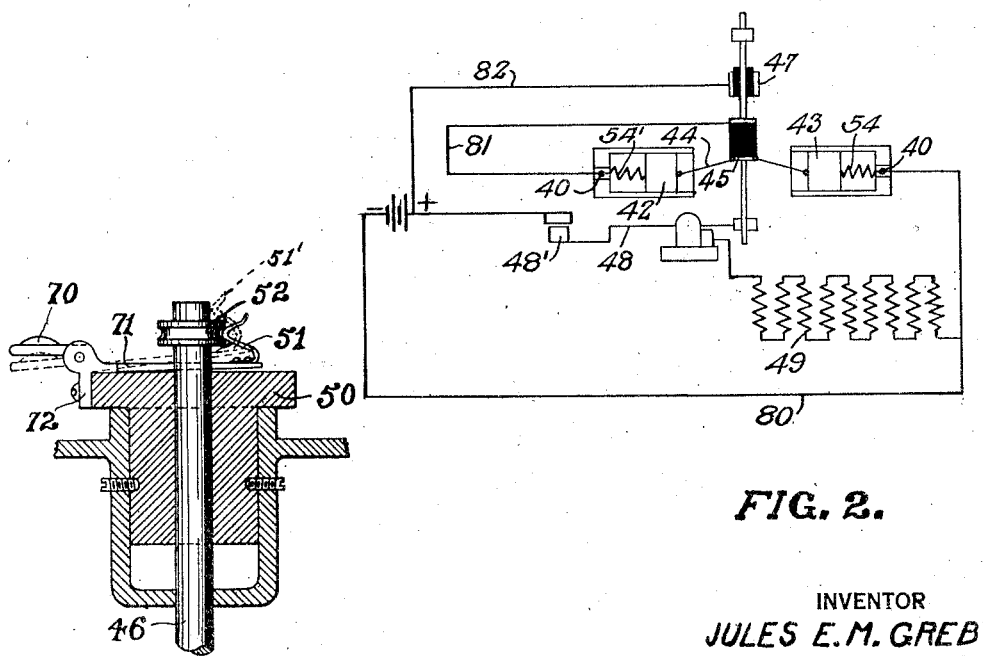
FIG. 2.
FIG. 3.
INVENTOR
JULES E. M. GREBY
BY
ATTORNEYS Patented Jan. 5, 1937

2,066,345

UNITED STATES PATENT OFFICE 2,066,345

AUTOMATIC TEMPERATURE REGULATOR

Jules Ernest Michel Grèby, Issy-Les-Moulineaux, France

Application July 17, 1931, Serial No. 551,517
In France June 1, 1924

8 Claims. (Cl. 200—122)

The present application is a continuation in part of applicant's co-pending application Serial No. 731,496, filed August 11, 1924, the present case being directed to a modified embodiment of an automatic temperature regulator of the type described and broadly claimed in the above mentioned patent application.

My invention has for its object an automatic temperature regulator which allows:

1—The temperature to be held automatically constant in a number of devices.

2—An electric circuit to be broken automatically and definitively when the temperature passes above the stated limit.

3—An electric circuit to be closed and alarm devices to be actuated when the temperature has risen beyond the said stated limit.

My invention has also for its object simple and efficient means whereby the temperature regulator may control from a distance any desired device.

The characteristic features of my improved temperature regulator allow the above mentioned objects to be attained together with other interesting objects to be disclosed hereinafter as will be apparent from the following description and appended claims.

I have shown by way of example, on accompanying drawing a form of execution of my invention.

Fig. 1 is a longitudinal section of an automatic temperature regulator disposed under the antiseptic kiln the temperature of which is to be controlled.

Fig. 2 is a wiring diagram for a preferred type of the invention.

Fig. 3 is a detail view of the top of this regulator.

In the example shown the automatic temperature regulator is mounted in a housing which may have a window or observation opening on the side next the observer, and comprises two cylinders 36 and 37 of quartz or any other insulating refractory material adapted to resist mechanical stresses. These cylinders are closed at one end with a metal cover 38, 38₁ provided at its center with a duct 39 adapted to be closed by a ball 40, which latter is urged against its seat in the duct 39 by a threaded cap 41 so as to provide perfect watertightness for this part of the cylinder.

In each cylinder 36, 37, is adapted to move a piston 42, 43 submitted to the action of an expansible liquid the nature of which depends on the sensibility required and the temperature desired. This liquid may be chosen in a wide range of liquids between alcohol and sweet oils. The pistons 42, 43 are hollow and their surface in contact with the cylinder shows four parallel grooves in which rings 30 are mounted. These pistons are connected with the slide 45 by means of connecting rods 44. The expansible liquid, during assembly of the device and before the caps 41 are in place, enters the cylinders from a suitable reservoir or container under action of the suction produced by the pistons through the ducts 39 as the pistons are drawn toward the outer ends of the cylinders. When the cylinders are filled the caps 41 are assembled on the cylinders over the balls 40.

The slide 45 is mounted on a vertical shaft 46 which may also move vertically. Said shaft is provided at a suitable point of its length with a threaded part 47a on which is mounted a collar 47 the position of which corresponds to the temperature which it is desired to keep in the kiln. The said collar is bored at 64 and is held against undesired or untimely movements by the engagement with the recess 64 of the spherical part 65 of the small lever 56 of the temperature indicating hand 57. A ring 58 is loosely mounted on the lower end of the shaft 46 and retained thereon by a nut 66. This ring is recessed at 67 for receiving the spherical end 59 of the switch lever 48 controlling the contacting parts 60 in the electric circuit feeding the heating resistances 49 of the antiseptic kiln.

The hand 61 indicates whether the circuit is broken or closed and is controlled by the insulating pulley 62 keyed to the shaft 46. The latter carries also a ring 53 the part played by which will be disclosed hereinafter.

When the liquid contained in the cylinders 36 and 37 expands under the action of the temperature in the kiln, the pistons 42 and 43 move slowly in the direction of the arrows 68. Due to the connecting rods 44, the slide 45 rises over shaft 46 until it abuts against the collar 47. The liquid continuing to expand, the slide 45 raises through the said collar 47, the shaft 46 together with the ring 58 and the insulating pulley 62.

When rising the collar 47 causes the temperature indicating hand 57 to move in front of the graduations 63; the insulating pulley 62 causes the hand 61 to approach its position r corresponding to the broken circuit. The ring or washer 58, upon rising, lowers the lever 48 and thereby when the displacement of the shaft 46 will have reached the amplitude corresponding to the desired temperature, the current is switched off the circuit of the resistances 49.

When the kiln temperature decreases, the liquid in the cylinders 36 and 37 contracts, the pistons 42 and 43 move away from the shaft 46 and cause the rods 44 to lower the slide 45.

The vertical shaft 46 is not affected by this return movement as it is held raised by the spring 51 acting against the lower part of the ring 52. If the temperature continues falling and the pistons move still further outward, the slide 45 abuts against the ring 53 whereby the shaft 46 is lowered. This causes the movement.

1—Through the pulley 62 of the hand 61 indicating the making and breaking of the circuit.

2—Through the collar 47 of the hand 57 indicating the temperature.

3—Through the ring 58 of the switch lever 48.

As soon as the slide 45 begins driving the shaft 46 downwardly through its ring 53, the ring 52 is released from the pressure of the spring 51 which is caused to pass above the ring. The shaft 46 being thus free, falls rapidly with the lever 48 and closes the circuit rapidly.

The electric current passes through the device as follows: from the positive terminal through the contacts 48', the lever 48 and thence into the resistances 49 constituted by a series of springs, the return being effected as shown on the diagram of Figure 4, through the connection 80. When the circuit is about to be broken i. e. when the slide abuts against the collar 47, current passes also through the ball 40, the resistance 54, the piston 43, rod 44 the slide 45 (the lower part of which is insulated from the upper part), the second rod 44, the piston 42, the second resistance 54', the second ball 40, thence to the upper part of slide 45 by connection 81, thence through collar 47 and connection 82 and returns to the negative terminal. At this moment the resistances 54 and 54' are heated and the liquid in the cylinder expands rapidly whereby the different parts are very speedily displaced and the contacts 48' are broken with a great suddenness thus shutting off the current.

In order to make the device work at a predetermined temperature, the collar 47 screwed over the shaft 46 is adjusted through a rotation of this shaft by means of the knob 50. This knob is rotated until the hand 57 indicates on the graduated scale 63 the desired temperature; the collar 47 is thus brought to a position on shaft 46 which causes the breaking of the current for this temperature.

The resistances 54 and 54' serve:

1—To compensate the loss of heat due to the distance,

2—To provide the suitable expansion of the liquid 55.

When the intensity of the current is sufficient, the resistances 54 and 54' are mounted in shunt with switch contacts 48' as shown on Fig. 2 and are inserted in the circuit only when the slide 45 comes against the collar 47. In this case the current passes from the positive terminal through the resistances 49, the connection 83, lever 48, contacts 48' and thence to the negative terminal. Upon contact of the side 45 with the collar 47, the current passes in part through the resistance 54, piston 43, arm 44, second arm 44, piston 42, resistance 54', conductor 81 and conductor 82 to the negative side of the circuit. The expansion of the fluid acting elastically on the pistons is increased by the greater heating suddenly provided whereby the breaking of the circuit is very sudden. All the parts connecting the cylinders 36 and 37 are insulated. I may state that the resistances thus inserted in the expanding fluid ensure the following advantages:

1—They act only when the slide abuts against the collar 47 keyed to the vertical shaft i. e. when the circuit is to be broken.

2—The pistons move due to the action of the expanding liquid in the cylinders. The suction of the liquid produces a certain vacuum which will return the pistons suddenly to their original position under the action of atmospheric pressure.

The above described regulator comprises also adjusting means for allowing the regulator to operate either a single and definitive breaking or else a series of breakings and closings of the circuit whenever the temperature rises above or falls underneath a given temperature.

This device is shown in detail on Fig. 3: the vertical reciprocating shaft 46 is provided with a ring 52' adapted to snap in and out of engagement with the yielding hook 51' secured to the rocking lever 71, said lever being controlled by the depression of a knob 70' pivotally secured to the stationary part 72.

The working of this device is as follows: the spring 51' for the position shown in full lines on Fig. 3 engages the ring 52' when the sliding shaft 46 moves in the direction of arrow 73 under the action of the rising temperature so as to switch the current off as disclosed hereinabove. The shaft 46 remains therefore raised by the action of the spring 51' on the ring 52' whereby the circuit remains permanently broken. In this case, the regulator keeps thus the circuit broken once the temperature has risen above a predetermined limit, even if it were to fall subsequently under this value.

On the contrary if the knob 70' is depressed the spring 51' is brought into the position 51" shown in dotted lines on Fig. 3, the ring is entirely disengaged with reference to the spring whatever position the shaft 46 may move into under the action of the temperature. Consequently, as soon as the temperature falls the shaft 46 falls in the direction opposed to the arrow 73 and closes again the electric circuit.

In this latter case, the regulator provides a succession of breakings and closings of the circuit, as the temperature passes above a stated limit or falls underneath same. I provide thereby a spring released heating apparatus which is started operating as soon as the temperature passes beyond a predetermined limit.

My invention, as shown, embodies a thermic regulator for an electric circuit allowing an automatic and sudden breaking of the said circuit when the desired temperature is reached.

What I claim is:

1. In a thermostatic device for making and breaking an electric circuit, a pair of opposed cylinders, a liquid contained in the cylinders and adapted to expand under the action of varying temperature, an electric heating resistance immersed in the liquid in each of the cylinders, pistons adapted to reciprocate in the cylinders as the liquid varies in volume, a shaft, a slide member about the shaft, connecting members pivoted to the slide member and to the said pistons whereby the slide member is moved with the pistons, and adjustable means connected to the said shaft and adapted to cooperate with the slide member to open the electric circuit.

2. In a thermostatic device for making and breaking an electric circuit, a pair of opposed cylinders, a liquid contained in the cylinders and adapted to expand under the action of varying temperature, an electric heating resistance immersed in the liquid in each of the cylinders, pistons adapted to reciprocate in the cylinders as the liquid varies in volume, a shaft, a slide member about the shaft, connecting members pivoted to the slide member and to the said pistons whereby the slide member is moved with the pistons, adjustable means connected to the shaft and adapted to cooperate with the said slide member to move the shaft when the pistons are moved, and visible means connected to the said adjustable means adapted to indicate the degree of adjustment of the said adjustable means.

3. In a thermostatic device for making and breaking an electric circuit, a plurality of cylinders, a liquid contained in the cylinders and adapted to expand under the action of varying temperature, an electric heating resistance immersed in the liquid in each of the cylinders, pistons adapted to move in the cylinders as the liquid varies in volume, a shaft, means for connecting the shaft and the pistons, and adjustable means associated with the shaft whereby the electric circuit is made or broken at a predetermined point in the movement of the said pistons.

4. In a thermostatic device for making and breaking an electric circuit, a plurality of cylinders, a liquid contained in the cylinders and adapted to expand under the action of varying temperature, an electric heating resistance immersed in the liquid in each of the cylinders, pistons adapted to move in the cylinders as the liquid varies in volume, a shaft, pivotal means connecting the shaft and the pistons, adjustable means associated with the shaft whereby the electric circuit is made or broken at a predetermined point in the movement of the pistons, and means associated with the said adjustable means to indicate visibly the said predetermined point.

5. In a thermostatic device for making and breaking an electric circuit, a pair of opposed cylinders, a liquid contained in the cylinders and adapted to expand under the action of varying temperature, an electric heating resistance immersed in the liquid in each of the cylinders, pistons adapted to reciprocate in the cylinders as the liquid varies in volume, a shaft, a slide element adapted to slide upon the shaft, connecting members pivoted to the pistons and the slide element, a collar adjustably secured to the shaft and adapted to cooperate with the said slide element to move the shaft, an electric circuit including a switch member, means connected to the shaft whereby the switch member is opened or closed as the shaft moves, visible means connected to the said adjustable collar adapted to indicate the adjustment of the collar, and visible means associated with the shaft adapted to indicate the open or closed position of the said switch member.

6. In an automatic temperature regulator, a circuit including a resistance and switch, a cylinder having a liquid therein adapted to expand and contract under varying temperature changes of said resistance, a second circuit including a heating element for the liquid and including means adapted when the liquid has expanded under the influence of the heat of said resistance, to close the second circuit through said heating element to thereby suddenly further expand said liquid, and means controlling said switch and adapted under the sudden expansion of said liquid to actuate said switch.

7. In an automatic temperature regulator, a circuit including a resistance and switch, a cylinder having a liquid therein adapted to change volume under varying temperature changes, a second circuit including a heating element for the liquid and including circuit making and breaking means adapted to be actuated when the liquid has been expanded to establish said second circuit through said heating element, a piston under control of said liquid, and inter-connecting means between the piston and switch adapted to actuate the latter upon the expansion of said liquid due to the heat generated by the closing of said second circuit.

8. In an automatic temperature regulator, a circuit including a resistance and switch, a temperature-responsive device, a second circuit including a heating element for said temperature-responsive device, means for closing said second circuit through said heating element when said temperature-responsive device has responded to a predetermined temperature whereby to suddenly further actuate said temperature-responsive device, and means under control of said temperature-responsive device to actuate said switch.

JULES ERNEST MICHEL GRÉBY.